(12) United States Patent
Huff et al.

(10) Patent No.: US 8,684,166 B2
(45) Date of Patent: Apr. 1, 2014

(54) TRAYS AND APPARATUS AND METHOD FOR REMOVING CARTONS FROM TRAYS

(75) Inventors: David T. Huff, Toano, VA (US); Asim Behera, Burtonsville, MD (US); Don L. Steketee, Newport News, VA (US); Edward L. Spicer, Yorktown, VA (US)

(73) Assignee: Swisslog Logistics, Inc., Newport News, VA (US)

( * ) Notice: Subject to any disclaimer, the term of this patent is extended or adjusted under 35 U.S.C. 154(b) by 375 days.

(21) Appl. No.: 12/993,519

(22) PCT Filed: May 21, 2009

(86) PCT No.: PCT/US2009/044833
§ 371 (c)(1),
(2), (4) Date: Nov. 19, 2010

(87) PCT Pub. No.: WO2009/143341
PCT Pub. Date: Nov. 26, 2009

(65) Prior Publication Data
US 2011/0061995 A1 Mar. 17, 2011

Related U.S. Application Data

(60) Provisional application No. 61/054,936, filed on May 21, 2008.

(51) Int. Cl.
*B65G 47/34* (2006.01)
*B65G 17/32* (2006.01)
(52) U.S. Cl.
USPC .............................. 198/463.3; 198/617; 53/58
(58) Field of Classification Search
None
See application file for complete search history.

(56) References Cited

U.S. PATENT DOCUMENTS

| 3,297,129 A | 1/1967 | Lesch |
| 4,051,958 A | 10/1977 | Richardson et al. |
| 5,009,053 A * | 4/1991 | Langenbeck et al. ............. 53/58 |
| 5,360,109 A | 11/1994 | Janota |

(Continued)

FOREIGN PATENT DOCUMENTS

| EP | 0350473 A1 | 1/1990 |
| EP | 2524875 A1 | 11/2012 |

(Continued)

OTHER PUBLICATIONS

International Search Report for PCT Patent Application No. PCT/US2009/044833, dated Jan. 11, 2010.

(Continued)

*Primary Examiner* — Kavel Singh
(74) *Attorney, Agent, or Firm* — Bachman & LaPointe, P.C.

(57) ABSTRACT

A system includes trays of a plurality of different widths and an unloading system for unloading cartons from the trays. The trays (20; 20'; 20") each comprise a base (22) and a pair of end walls (30) extending upward from the base. The unloading system (200; 200') comprises a plurality of fingers (202A-202I). Each of the end walls comprise a plurality of vertical slots (40) open to an upper edge of the end wall. The fingers are positioned and dimensioned to pass through the slots of the trays as the trays are delivered by the tray delivery conveyor to lift contents of the trays. The fingers are positioned so that some fingers pass through the slots of each of the different widths, but others pass only through slots of wider said widths.

15 Claims, 7 Drawing Sheets

(56) References Cited

U.S. PATENT DOCUMENTS

| | | | |
|---|---|---|---|
| 5,787,680 A * | 8/1998 | Tisma et al. | ............ 53/244 |
| 5,964,562 A | 10/1999 | Bernard, II et al. | |
| 6,109,445 A | 8/2000 | Beyer | |
| 6,394,744 B1 | 5/2002 | Price | |
| 6,662,931 B2 | 12/2003 | Bruun et al. | |
| 6,896,471 B2 | 5/2005 | Svyatsky et al. | |
| 6,915,904 B2 | 7/2005 | Winkler | |
| D515,315 S | 2/2006 | Rader et al. | |
| 7,047,710 B2 | 5/2006 | Winkler | |
| 7,097,045 B2 | 8/2006 | Winkler | |
| 7,353,950 B2 | 4/2008 | Stahl | |
| 7,370,752 B2 | 5/2008 | Neiser et al. | |

FOREIGN PATENT DOCUMENTS

| | | | |
|---|---|---|---|
| FR | 1341242 | | 10/1963 |
| FR | 1341242 | A | 10/1963 |
| JP | 55-046401 | U | 3/1980 |
| JP | 07-215477 | A | 8/1995 |
| JP | 2006-131341 | A | 5/2006 |

OTHER PUBLICATIONS

Observations under Article 115 EPC for European Publication No. 2313334, dated Jun. 21, 2011.

Observations under Article 115 EPC for European Publication No. 2313334, dated Sep. 1, 2011.

European Search Report for EP Patent Application No. EP09751569, dated Feb. 6, 2013.

European Office Action for EP Patent Application No. EP09751569, dated Oct. 15, 2013, pp. 1-3.

* cited by examiner

FIG. 12

TRAYS AND APPARATUS AND METHOD FOR REMOVING CARTONS FROM TRAYS

CROSS-REFERENCE TO RELATED APPLICATION

Benefit is claimed of U.S. Patent Application Ser. No. 61/054,936, filed May 21, 2008, and entitled "APPARATUS AND METHOD FOR REMOVING CARTONS FROM LOAD BEARING TRAYS", the disclosure of which is incorporated by reference herein in its entirety as if set forth at length.

FIELD OF THE INVENTION

The present invention relates to the automated handling of cartons in warehouses and distribution centers and, more particularly, to the automated removal of the cartons from load bearing trays.

BACKGROUND OF THE INVENTION

Current industry practice to remove cartons automatically from trays utilizes one of two types of designs. The first design involves stopping the tray, lifting the carton up on fingers and raking the carton off the fingers. This design requires the tray to come to a stop thereby limiting the potential throughput rate. In this design, a single tray removal device can have the ability to process multiple tray sizes but imposes certain limitations to the number of sizes of trays that can be processed by a single tray removal device. It also at times imposes additional limitations on the orientation of trays with regard to the side or dimension of the tray that first approaches the tray removal device.

A second design is characterized by previous attempts to utilize a continuous process involving a "scraping" type device to lift the carton up and onto a powered belt. This design requires a grid of raised platforms on the bottom of the tray. The platforms form an elevated surface upon which the carton can rest. The fingers of the scraping device reach between the platforms and under the elevated carton. As the tray moves on the powered belt, the back lip of the tray drives the carton up the inclined scraper surface formed by the assembly of fingers and onto a powered belt. This design requires significantly increased vertical height in the tray design, resulting in the tray itself occupying a significant amount of space in the storage facility. It also requires the use of relatively uniform size cartons to allow the back edge of the tray to drive the carton far enough up the inclined surface to engage the powered takeaway conveyor. This design also is limited in that each tray removal device can process only one size tray thus requiring multiple devices as a means to process multiple tray sizes.

The cartons handled by automated systems can vary in size, therefore it is a goal of carton removal systems to provide and use trays that are of a size that will contain the carton but are no larger than necessary to do so. To the degree that the tray is larger than the carton, some space in the storage facility may be wasted. In these applications a wide variety of carton sizes are used. In order to maximize the utilization of the storage volume, multiple tray sizes are required.

SUMMARY OF THE INVENTION

In one aspect of the invention, there is provided an apparatus and method for removing cartons from load bearing trays as the trays move continuously on a generally planar conveyor surface.

The sizes of trays may be chosen to accommodate most efficiently the sizes of the individual cartons. The carton removal apparatus can act on the trays and their contents without regard to the size of the tray and without regard to the fore and aft orientation of the trays such that either end of the tray may approach the carton removal apparatus first.

The tray provides a means for the apparatus to insert a multiplicity of acutely sloping wedges/fingers into generally vertical slots in the leading edge side of the advancing tray, the slots extending upward through the top edge of the tray side wall and downward to join with recessed grooves in the bottom surface of the tray. The wedges are positioned such that they insert between the bottom surface of the carton and the tray surface on which the carton rests, thereby lifting the front edge of the advancing carton onto the upper surfaces of the wedges.

In an exemplary embodiment, the planar upper surface of each wedge joins with, is aligned with, and is continued by, a moving conveyor belt of generally the same width as the upper surface of the individual wedge. The forward motion of the tray pushes the carton onto the upper surface of the wedges to a point at which the bottom surface of the carton comes in contact with the multiplicity of moving conveyor belts which then support the carton and move it forward, generally independent of the motion of the tray. The carton is supported by and transported by the multiplicity of conveyor belts and is thus separated from the tray. The carton, now removed from the tray, continues its motion onto a conveyor surface that adjoins the conveyor belts of the carton removal apparatus.

Another aspect of the invention involves a system having a plurality of trays, each comprising a base and a pair of end walls extending upward from the base. The system includes a tray unloading system. The trays are of a plurality of different widths. The tray unloading system comprises a plurality of fingers. Each of the end walls comprises a plurality of vertical slots open to an upper edge of the end wall. The fingers are positioned in dimension to pass through the slots of the trays as the trays are delivered to lift contents of the trays. The fingers are positioned so that some fingers pass through the slots of each of the different tray widths but others pass only through slots of wider said tray widths.

In various implementations, the fingers may be positioned at an essentially non-constant spacing effective to accommodate the different widths. The fingers may be laterally asymmetrically positioned. The non-constant spacing may comprise: a first group at a non-constant first on-center pitch; and a plurality of additional fingers separated from the first group by one or more gaps. The plurality of additional fingers may comprise a single intermediate finger separated from the first group by a first gap at an on-center dimension other than a multiple of said first on-center pitch and at least two more fingers separated from the intermediate finger by a second gap at an on-center dimension other than a multiple of said first on-center pitch. The first group may consist of five fingers. The at least two additional fingers may consist of said two additional fingers at said first on-center pitch.

The fingers each may comprise a tip member and a conveyor and may be positioned to guide the contents to a tray content removal conveyor. The finger conveyors may be powered in common by a motor.

Further aspects involve the method for operating such a system. A tray delivery conveyor is driven to move the trays downstream to the transfer system. At least some of the fingers are passed through the slots of the trays as the trays are delivered by a tray delivery conveyor. The passing includes passing the tip members through a leading one of the end walls of each tray and passing the tip members into grooves in the base of each tray and below the contents, a wedging action of the tip members providing an initial said lift of the contents of the trays. The contents are passed along the fingers to the finger conveyors. The finger conveyors are driven to transfer the contents to a tray content removal conveyor. The tray content removal conveyor is driven to further transport the contents. A trailing one of the end walls may push the contents up the tip portions or notches in a tray base may do so. The fingers may pass inside-to-outside through the trailing end wall. There may be a plurality of different widths of the trays. A partially different group of the fingers may pass through the slots respectively of the trays of different widths.

The different tray widths may include at least first, second, and third widths. The fingers may be positioned at a spacing effective to accommodate the different widths as firsts of the first side walls of the trays pass in a predetermined alignment with a first edge of the conveyor so that: the first width is accommodated by a first terminal group of the fingers passing through associated ones of the slots with the second side wall passing through a first gap between the first terminal group and a remainder of the fingers; the second width is accommodated by the first terminal group of the fingers and at least one of the remainder passing through associated ones of the slots with the second side wall passing through a second gap between the at least one of the remainder and remaining fingers of the remainder; and the third width is accommodated by the first terminal group of the fingers and at least two of the remainder passing through associated ones of the slots.

Further aspects of the invention involve trays. Each tray comprises a base and a pair of end walls extending upward from the base. The base includes an upper surface having a plurality of interspersed longitudinal grooves and ridges. Each of the end walls comprises a plurality of vertical slots open to an upper edge of the end wall and respectively aligned with an associated said groove. There may be at least two distinct lateral sizes of the slots and grooves. In various implementations, the tray may be a nineteen inch wide tray having exactly seven said slots and grooves or the tray may be a twenty-six inch wide tray having exactly ten said slots and grooves. The tray may have exactly seven said slots, a central group of three of the slots having larger slot width than the two terminal pairs of two slots or the tray may have exactly ten said slots and grooves, two terminal groups of three slots having slot width less than the respective adjacent slots separating the two terminal groups from a central pair of slots.

Such a system may have one or more of the following advantages.
   One advantage is the ability to remove the carton from the tray while the tray remains in motion, thereby removing a greater number of cartons in a specific period of time.
   Another advantage is the ability to use a greater variety of tray sizes than previous systems, each tray being chosen to fit most closely the carton that is placed on it, thereby making more efficient use of space within the storage facility.
   Another advantage is the reduction in the thickness, or vertical height, of the bottom surface of the tray, such that the tray occupies a minimum of space beyond that which is required to contain the carton, thus making more storage space within the storage facility available for storage of cartons.
   Another advantage is the ability to handle multiple trays sizes in a single apparatus, thereby possibly reducing the number of devices required.
   Another advantage is an improved method of stacking empty trays on each other whereby the space required within the storage facility for the storage of empty trays is reduced.
   Another advantage is a process for automatic, unattended removal of cartons from a plurality of predetermined tray sizes, wherein the movement of the trays is continuous and without interruption, by a single carton removal apparatus.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 15 is a side view of the apparatus of FIG. 13.
Like reference numbers and designations in the various drawings indicate like elements.

DETAILED DESCRIPTION

Figure 1:
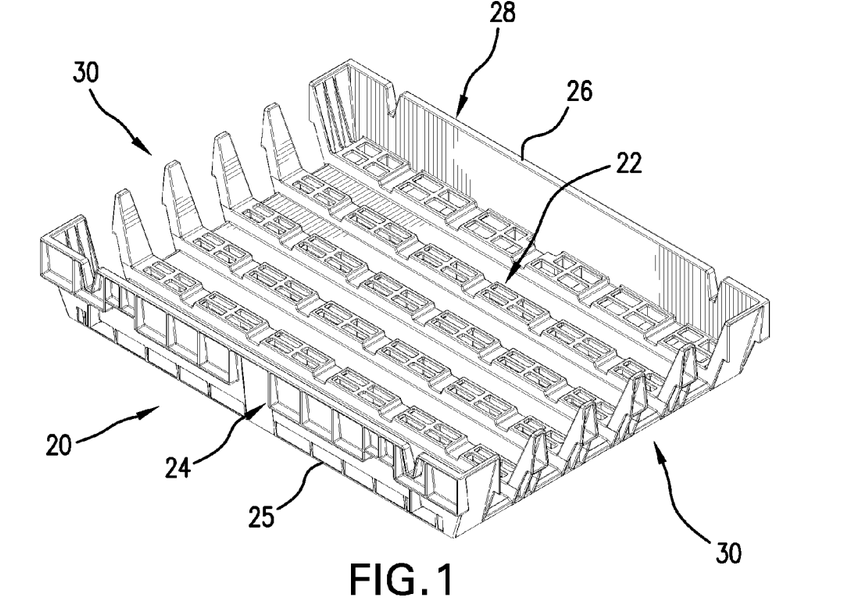
FIG. 1 is a view of a first (relatively small) tray.
Figure 3:
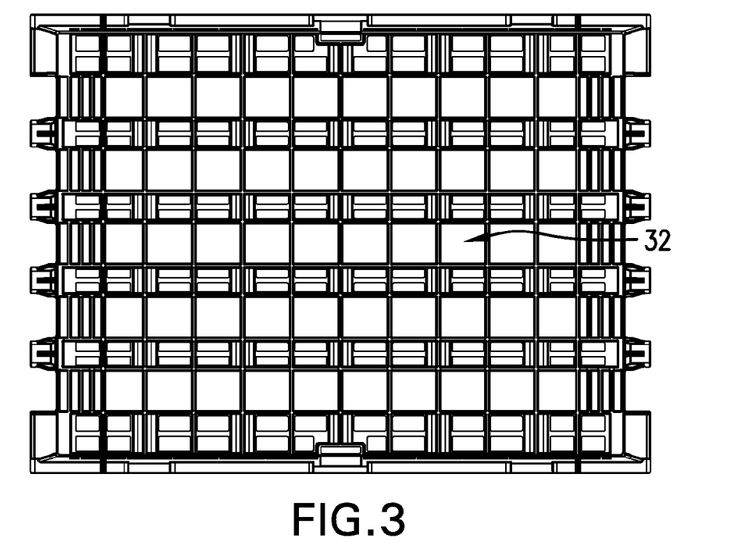
FIG. 3 is a bottom view of the tray of FIG. 1.
Figure 4:
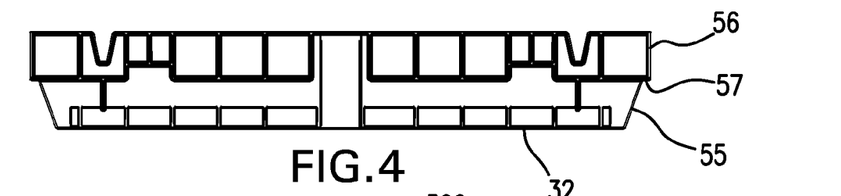
FIG. 4 is a side view of the tray of FIG. 1.
Figure 5:
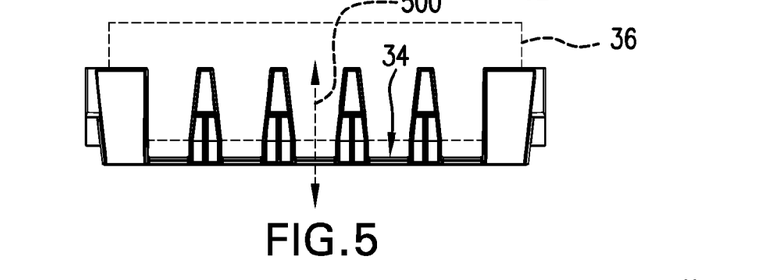
FIG. 5 is an end view of the tray of FIG. 1.
Figure 6:
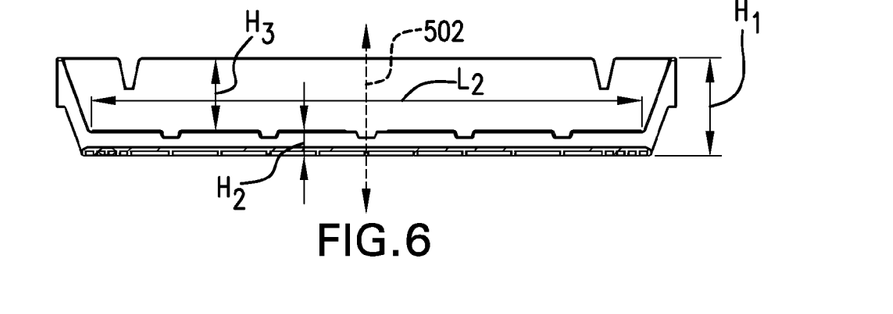
FIG. 6 is a vertical longitudinal sectional view of the tray of FIG. 1, taken along line 6-6 of FIG. 2.

One embodiment of a tray 20 is shown in FIG. 1. The tray has a base 22 and circumscribing wall structure 24 extending from a junction 25 with perimeter of the base to an upper rim 26. The wall structure includes two sloping, continuous and generally vertical sides (side walls) 28 and two generally vertical slotted ends (end walls) 30. The sides 28 and ends 30 extend to upper edges formed as portions of the rim 26. The base 22 has an underside or bottom 32 (FIGS. 3&4) which forms a tray bottom and has an upper surface or top side 34 (FIG. 5) which may support one or more cartons 36 contained within the wall structure.

The base has upwardly-open channels or grooves 38 (FIG. 2) which run from end to end, joining each end 30 at the base of a slot 40. The grooves 38 separate and are interspersed with ridges or lands 42. The base has upwardly-open transverse notches 44 passing from side to side along each of the ridges. The exemplary notches 44 are shallower than the grooves 38. The exemplary wall structure 24 has an inboard face/surface 50 and an outboard face/surface 52 each with respective portions along the sides 28 and ends 30 to form inboard and outboard surfaces thereof. The exemplary trays are of substantially rectangular planform having an overall width $W_1$ and an overall length $L_1$. Additionally, the tray has an interior width $W_2$ and length $L_2$ (measured as associated widths and lengths of the largest rectangular carton which may be supported on the upper surface of the base). An exemplary overall/exterior tray height is shown as $H_1$ from the underside of the base to the upper rim 26. An exemplary base thickness/height is $H_2$, leaving an interior depth/height of $H_3$ equals $H_1$ minus $H_2$. For reference, a longitudinal vertical medial plane is shown as 500 and a transverse vertical medial plane is shown as 502. The sides and ends of the tray slope outward slightly so that when trays are stacked on each other, the space required for storage of trays is kept needed. The outboard surface 52 is stepped (FIG. 4) with an upwardly divergent angled lower portion 55, a vertical upper portion 56, and an intermediate wedge 57 joining the upper and lower portions. When stacked, the trays nest with the intermediate portion 57 contacting or closely facing the upper rim 26 of the wall of the tray immediately below.

Figure 2:
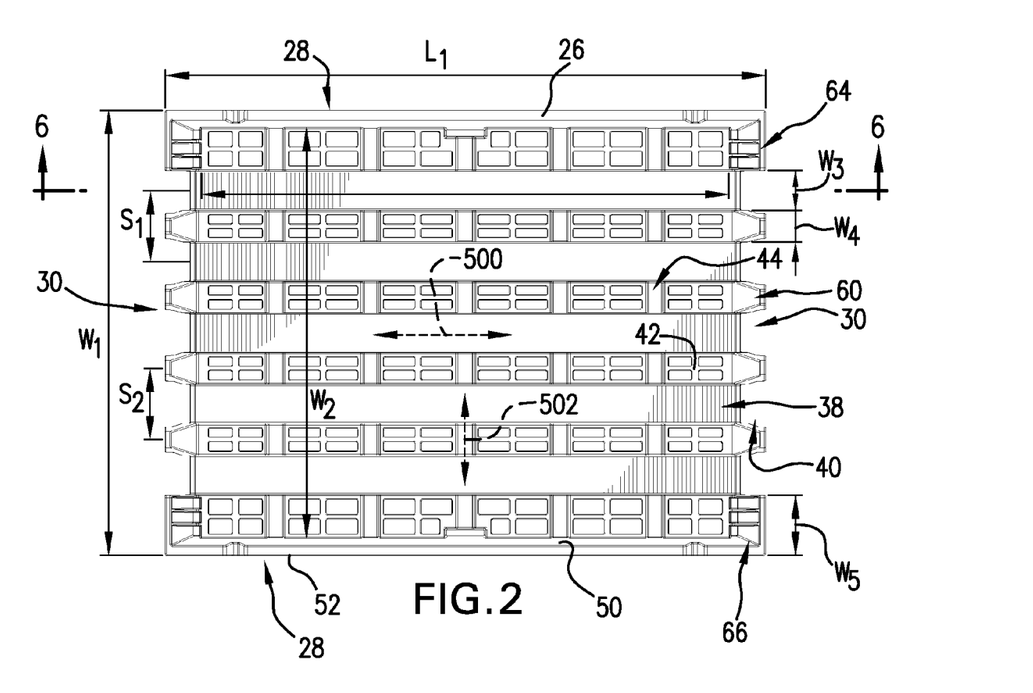
FIG. 2 is a top view of the tray of FIG. 1.

The slots 40 extend along/through the end walls 30 and are open to/at the upper edges of the end walls. The slots separate interspersed intact portions 60 of the end walls. The slots 40 and their associated grooves 38 are positioned and dimensioned to accommodate fingers (discussed below) of a defraying system for removing cartons. The exemplary slots/grooves each have a characteristic width $W_3$. The slots/grooves separate intact end wall portions 60 and ridges 42 having a width $W_4$. An on-center spacing $S_1$ of the slots/grooves is measured as half of the respective width $W_3$ of each two adjacent such slots/grooves plus the width $W_4$ of the intervening intact end portions/ridges. Similarly, an on-center spacing $S_2$ of the intact end portions/ridges is half of the respective widths $W_4$ of two adjacent such end portions/ridges plus the width $W_3$ of the intervening slot/groove. As is discussed further below, the widths $W_3$ and $W_4$ and spacings $S_1$ and $S_2$ can vary for the different slots/grooves and intact end wall portions/ridges. In the exemplary tray, respective left and right terminal portions 64 of the intact end walls (of associated corner portions 66 of the wall structure) have widths $W_5$ which are greater than $W_4$. This allows for relatively robust corner portions. This robustness may provide one or more of: lateral support of the side walls; vertical strength for stacking; longitudinal strength for retaining tray contents; and surface area for bar codes/labels/other indicia.

It is desirable to provide operation with multiple sizes of trays. Different tray lengths may readily be accommodated. However, accommodating different tray width creates problems. The exemplary tray 20 has five grooves/slots. If a larger tray were to merely be a laterally extended version (having more slots of the same width and spacing), there would be problems accommodating both trays. Specifically, if the detraying machine had fingers positioned to engage the slots of the larger tray, those fingers would interfere with one of the corner portions 66 of the smaller tray. Accordingly, as is discussed in further detail below, the basic tray of FIG. 1 can form one part of a system where a more complicated arrangement of defraying machine fingers are provided along with a more complicated distribution of slots in larger trays. An example is described below wherein the tray of FIG. 1 is the smallest of three exemplary sizes (more particularly, widths) of tray.

Figure 7:
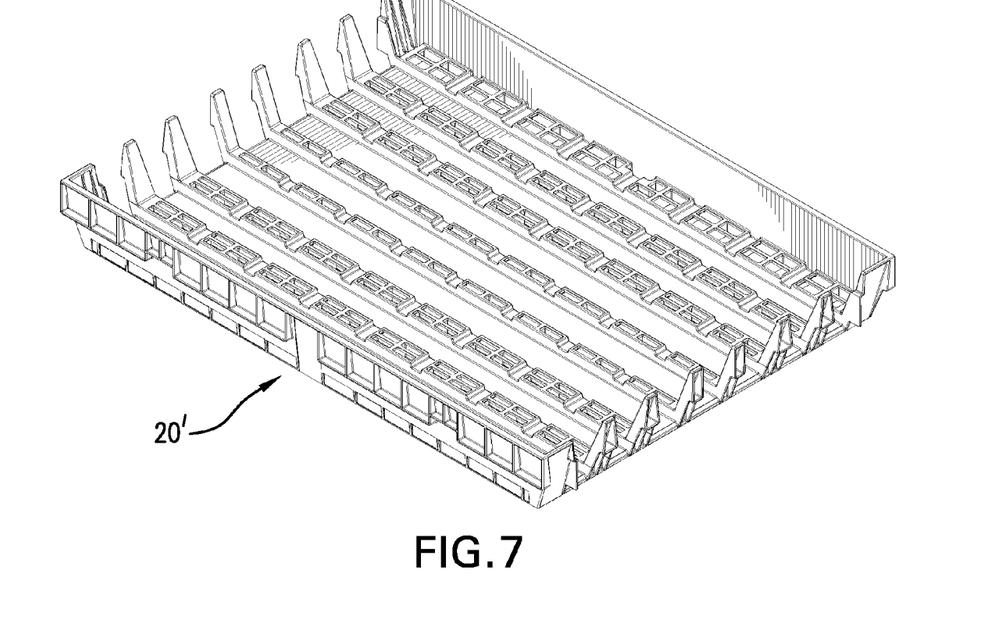
FIG. 7 is a view of a second (intermediate) tray.
Figure 8:
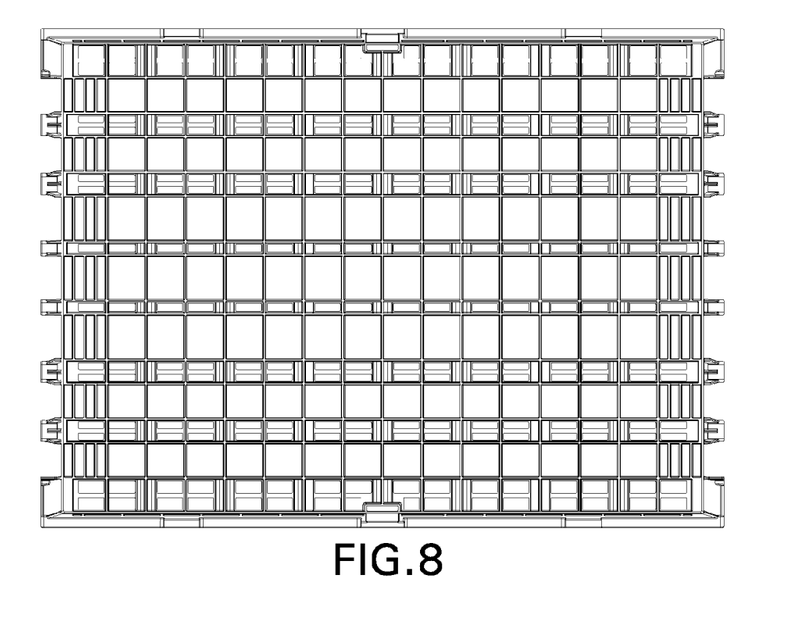
FIG. 8 is a top view of the tray of FIG. 7.
Figure 9:
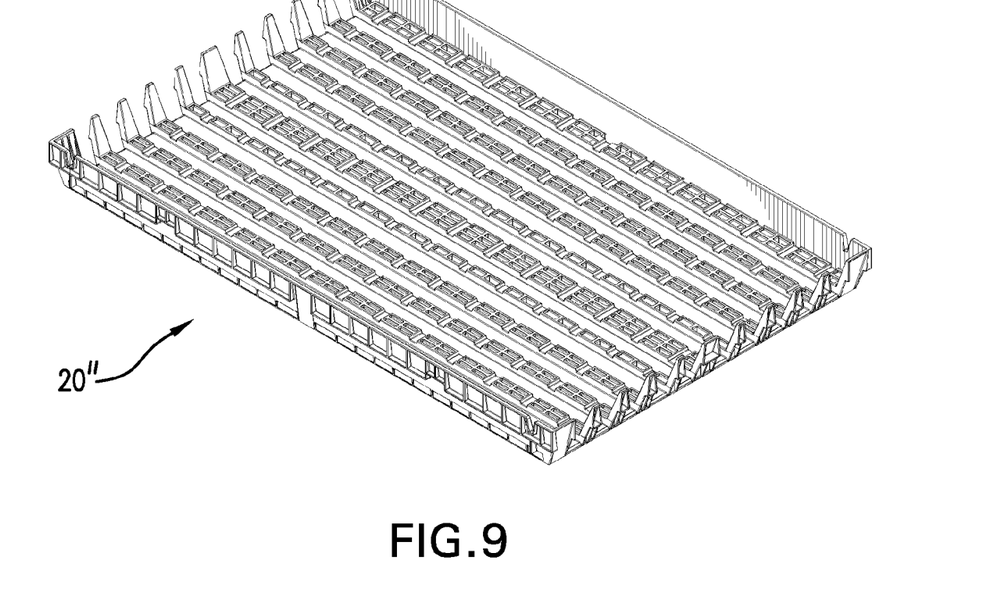
FIG. 9 is a view of a third (relatively large) tray.
Figure 10:
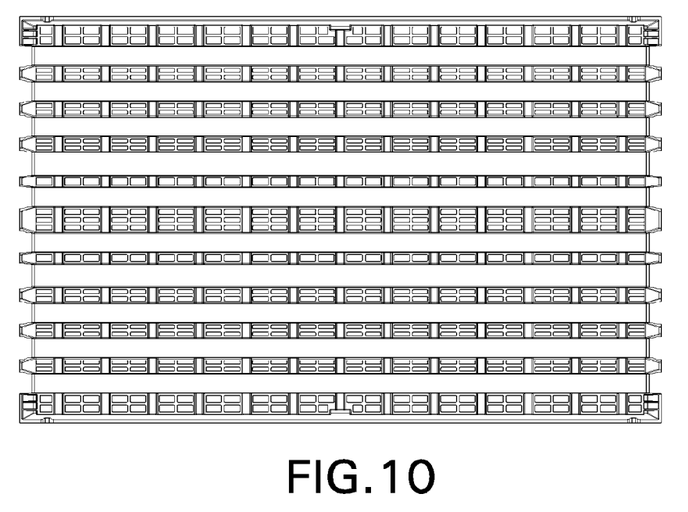
FIG. 10 is a top view of the tray of FIG. 9.

FIGS. 7&8 show an exemplary intermediate/medium size tray 20' and FIGS. 9&10 show an exemplary large tray 20" in the three-width system. As is discussed further below, each of the trays is of generally similar construction with similar relatively wide corner portions but with different groove/slot distribution. The variation in groove/slot distribution may best be visualized by first looking at the finger distribution of the detraying machine.

Exemplary exterior dimensions $L_1$ and $W_1$ of the tray 20 are nineteen inches (48 cm) and fourteen inches (36 cm) and inside dimensions $L_2$ and $W_2$ are seventeen inches and twelve inches. For the medium tray 20' these are: twenty-six inches (66 cm); nineteen inches; twenty-four inches (61 cm); and seventeen inches. For the large tray 20" these are: forty-one inches (104 cm); twenty-six inches; thirty-nine inches (99 cm); and twenty-four inches. These interior dimensions are as measured at the interior base of the side walls. Each of the three sizes has overall height $H_1$ of an exemplary three inches (8 cm). The base height $H_2$ of each size tray is an exemplary 0.75 inch (2 cm), and interior depth $H_3$ of an exemplary 2.25 inches (6 cm). These different sizes are similar in form but vary from each other, in addition to overall size, in the number and distribution of slots and the corresponding grooves. As is discussed further below, each tray has mirror image symmetry across the planes 500 and 502. Thus, each tray can be processed with either end leading.

The device is not limited to the use of only three sizes of trays and alternative embodiments could have more or fewer tray sizes and could use sizes different from those of the exemplary embodiment. The exemplary trays are made of plastic (e.g., a single-piece unitary polypropylene molding) of sufficient strength to bear the load of the cartons but alternative embodiments could be made of different plastics, metal or other materials.

Figure 11:
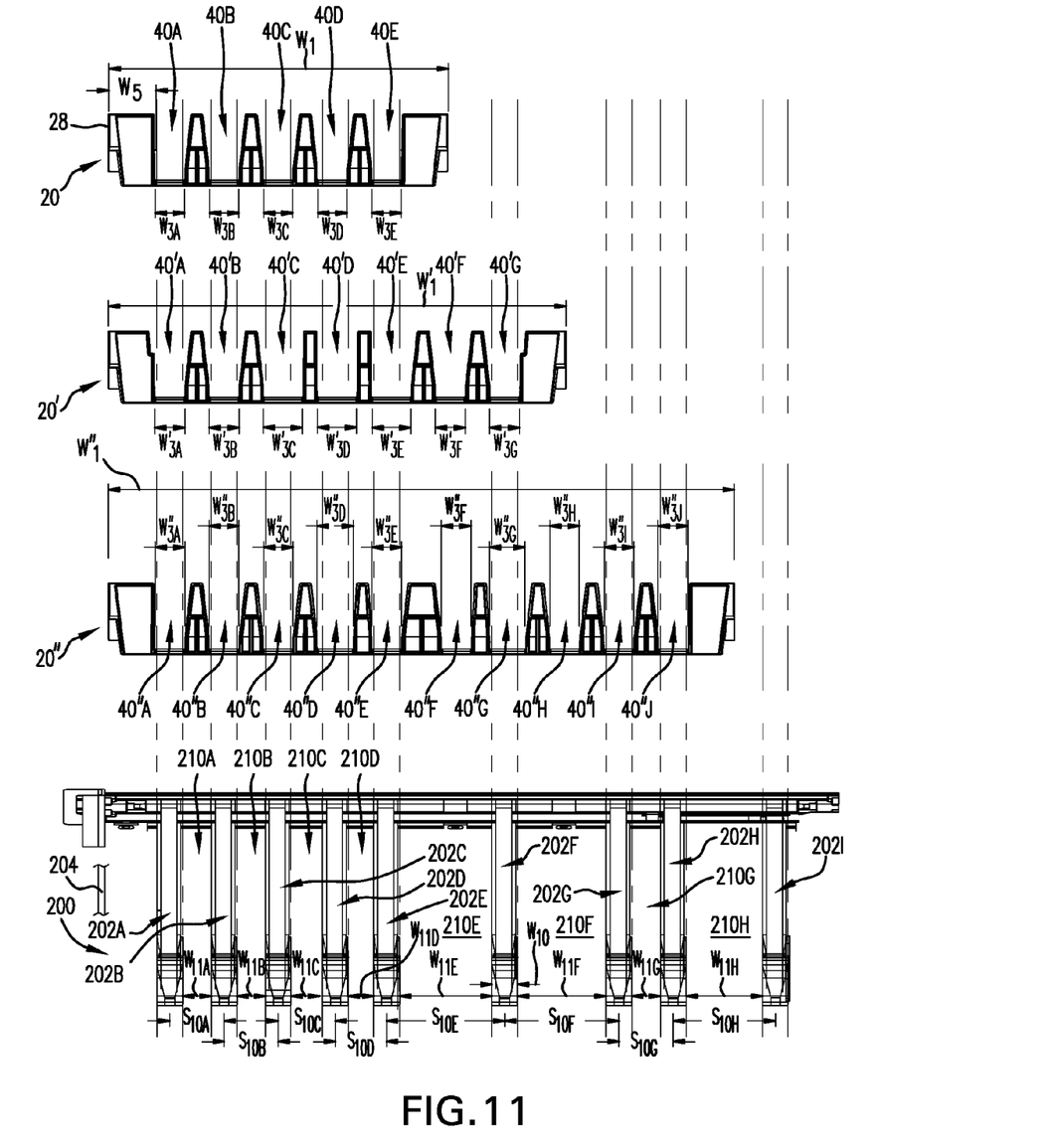
FIG. 11 is a composite view superimposing end views of the first, second, and third trays, in alignment with fingers of a detraying apparatus.

FIG. 11 shows an end view of three sizes of trays 20, 20', and 20", and the relationship the slots in each size tray bear to the vertical slots of the other size trays and to fingers of a detraying machine 200.

As is discussed further below, the detraying machine forms a portion of a transfer system for transferring cartons from the trays. The fingers are positioned to pass partially through the associated tray slots and grooves to remove (detray) the cartons from the trays. The exemplary machine 200 has nine fingers labeled 202A-202I. These nine fingers are configured for use with an exemplary four-tray system including a fourth tray (not shown) even wider than the tray 20". The first eight fingers 202A-202H, alone, facilitate use of the three-tray system. In the exemplary system 200, the trays pass along a conveyor system with a first side 28 in a predetermined lateral registry with the system 200 (e.g., against a first side 204 of a conveyor carrying the trays and their cartons). As the small tray 20 passes through the system, a first terminal group (i.e., starting from one side of the array of fingers) 202A-202E of an exemplary five of the fingers passes through respective slots/grooves (for purpose of reference, the slots 40 being subreferenced 40A-40E but the grooves 38 not being individually referenced). Each of the fingers is shown having a width $W_{10}$. An on-center spacing $S_{10}$ is also shown between adjacent fingers (and subreferenced $S_{10A}$-$S_{10H}$ for the respective pairs of fingers). A gap width between fingers is shown as $W_{11}$. As is discussed further below, the spacing or pitch $S_{10}$ for the group of fingers 202A-202E may be constant or close thereto. FIG. 11 shows respective inter-finger gaps 210A-210H. The width $W_{11}$ of the gap 210E is substantially larger than the width of the gaps 210A-210D within the first group of fingers 202A-202E. This gap is effective to accommodate the second side wall and associated corners of the small tray 20. This gap width may be more than twice the width of the gaps 210A-210D. As is discussed further below, the gap 210E may represent approximately the loss of a single finger from an array of constant spacing. However, the spacers may be further modified to improve coverage and feeding. For example, in the Table below, two examples are given one with exactly constant spacing of the first five fingers and the other with a slightly increased spacing between the third and fourth and a correspondingly slightly decreased spacing between the fourth and fifth. This may improve feeding consistency when the various sizes of trays are considered.

For removing cartons from the intermediate/medium tray 20', the first group of fingers 202A-202E are used along with the next finger 202F. These respectively pass through slots 40'A-40'E and 40'G (and their associated grooves) of the tray 20'. No finger passes through the penultimate slot 40'F. The slot 40'F exists for side-to-side symmetry (so that it would be in the position of slot 40'B if the tray is reversed). This symmetry allows trays to be used in either of two orientations. When passing the medium tray, its second side wall and associated corner portions pass through the gap 210F. Thus, the gap 210F may be of similar dimension to the gap 210E.

Similarly, for removing cartons from the large tray 20", the first group of fingers 202A-202E are also used along with the next finger 202F and the next two fingers 202G and 202H. These respectively pass through slots 40'A-40'E, 40'G, 40'I, and 40'J (and their associated grooves) of the tray 20". No finger passes through the slots 40'F and 40'H. These slots 40'F and 40'H exist, as noted above, for side-to-side symmetry (so that they would be in the positions of slots 40'E and 40'C if the tray is reversed as in a mirror image across the plane 500). When passing the large tray, its second side wall and associated corner portions pass through the gap 210H. Thus, the gap 210H (if a finger 202I is present) may be of similar dimension to the gaps 210E and 210F.

Exemplary slot and/or groove width may be measured at a given particular height or heights or as an average (e.g., a mean, a median, or a mode). This width is shown as essentially constant along the grooves and essentially constant along a lower/proximal portion of the intact wall portions (e.g., to about the level of the base upper surface). Thus, the intact wall portions' widths may similarly be measured. Exemplary slots diverge upwardly/distally. Accordingly, the exemplary intact wall portions converge upwardly/distally along upper/distal portions thereof. Exemplary finger spacing and slot width are shown in Table 1 where widths are measured along the lower/proximal portions. Example 1 repeats dimensions from the drawings of the priority application.

TABLE 1

Dimensions in inches

| Dimension | Ex. 1 | Ex. 2 |
|---|---|---|
| $S_{10A}$ | 2.25 | 2.25 |
| $S_{10B}$ | 2.25 | 2.25 |
| $S_{10C}$ | 2.25 | 2.38 |
| $S_{10D}$ | 2.25 | 2.12 |
| $S_{10E}$ | 4.9 | 4.9 |
| $S_{10F}$ | 4.75 | 4.75 |
| $S_{10G}$ | 2.25 | 2.25 |
| $S_{10H}$ | — | 4.24 |
| $W_1$ | 14.1 | 14.1 |
| $W'_1$ | 19.0 | 19.0 |
| $W''_1$ | 26.0 | 26.0 |
| $W_{3A-F}$ | 1.25 | 1.24 |
| $W'_{3A,B,F,G}$ | | 1.24 |
| $W'_{3C-E}$ | | 1.64 |
| $W''_{3A-C,E,F,H-J}$ | | 1.24 |
| $W''_{3D\&G}$ | | 1.49 |
| $W_4$ | 1.0 | 1.08 |
| $W_5$ | 1.92 | 1.93 |

FIGS. 12-15 show an exemplary eight-fingered machine 200' as part of a system including a tray delivery conveyor 240 and a tray content (carton) removal conveyor 242. Each finger is shown including an associated wedge-like tip 244. These tips 244 are sized to be a close but non-interfering fit in the grooves in the base of the approaching tray. The bottom surface 246 of each wedge/tip is oriented such that it is generally parallel to the upper (transport) surface of the conveyor 240 transporting the tray and is positioned a sufficient distance above conveyor 240 for the base of the tray along the grooves to pass below the wedge. The upper surface 246 of each wedge/tip slopes at an angle acute enough that the wedge can slip between the moving tray and the bottom surface of the carton carried by the tray, and is positioned to insert into the cavity formed by the groove in the base of the tray below the carton. Exemplary wedges/tips are arranged parallel to each other so that their upper surfaces combine to form a ramp up which the carton can be pushed by the movement of tray. The exemplary fingers each also have a conveyor belt 252 for transferring the cartons to the conveyor 242. Each finger may also include a strut 258 (FIG. 15) supporting the wedge and at least partially supporting the associated conveyor 252. A platform 260 may replace or span the struts at a height sufficiently above the conveyor 240 to allow the trays to pass below a leading edge 262 of the platform. The exemplary wedges have sufficient length so that the movement of the tray will drive the cartons up the wedges until the bottom surface of a leading portion of the carton comes into engagement with some or all of the conveyor belts 252.

A small carton may be pushed forward and up the ramp (formed by the wedges/tips) primarily by friction between the bottom of the carton and the tray. The notches 44 in the ridges in the tray bottom are provided to supplement this friction and the rear/trailing end wall of the tray acts as a positive stop should the carton slide on the tray and not be captured by the notches. For a relatively large carton (e.g., one that longitudinally fills the tray) the engagement may merely be with the rear/trailing end wall. As the carton is pushed far enough onto conveyor belts 252 by the motion of tray, a point is reached wherein the friction between belts and the bottom surface of carton is sufficient for the carton to be moved by belts without regard to the motion of the tray and the carton is pulled away from the tray. This may offer a benefit over prior systems by placing the point at which control of the carton passes from the tray to the carton removal apparatus earlier in the removal process. Extending the belts 252 through the slots 40 reaching below the top of the end wall of the tray and into the interior space of the tray may facilitate this.

Figure 13:
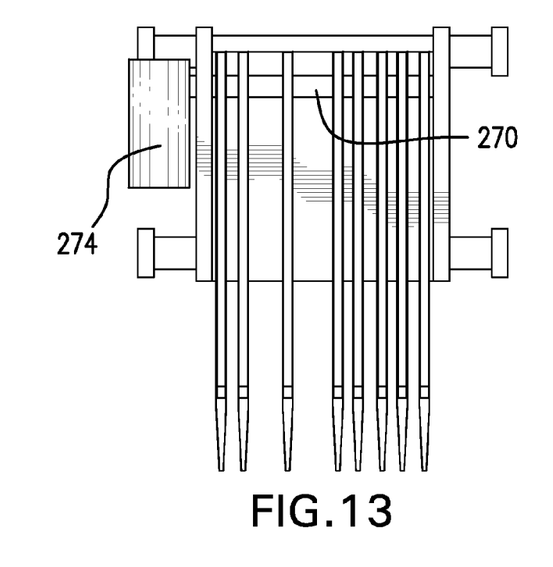
FIG. 13 is a top view of a defraying apparatus.
Figure 14:
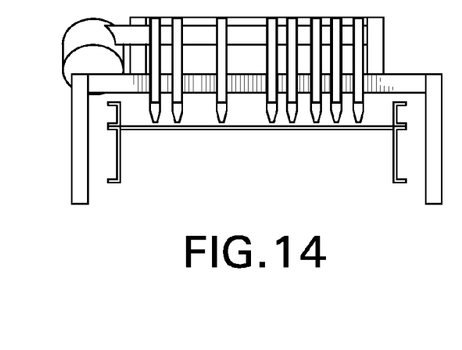
FIG. 14 is a front view of the apparatus of FIG. 13.
Figure 15:
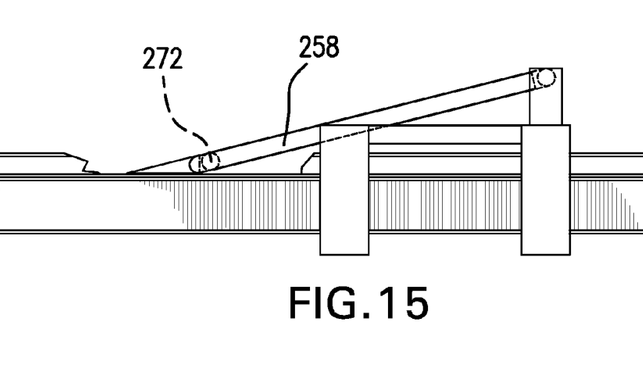

FIG. 13 shows that each strut member 258 extending from a common drive shaft 270 at the carton output end to an idler pulley 272 (FIG. 15) at the intake end where the wedge/tip is attached. Each strut holds its wedge/tip in position and additionally provides support for its belt as the assembly of belts supports the weight of the carton. A motor 274 and its connection with shaft 27 may be standard items typically used in conveyors.

Figure 12:
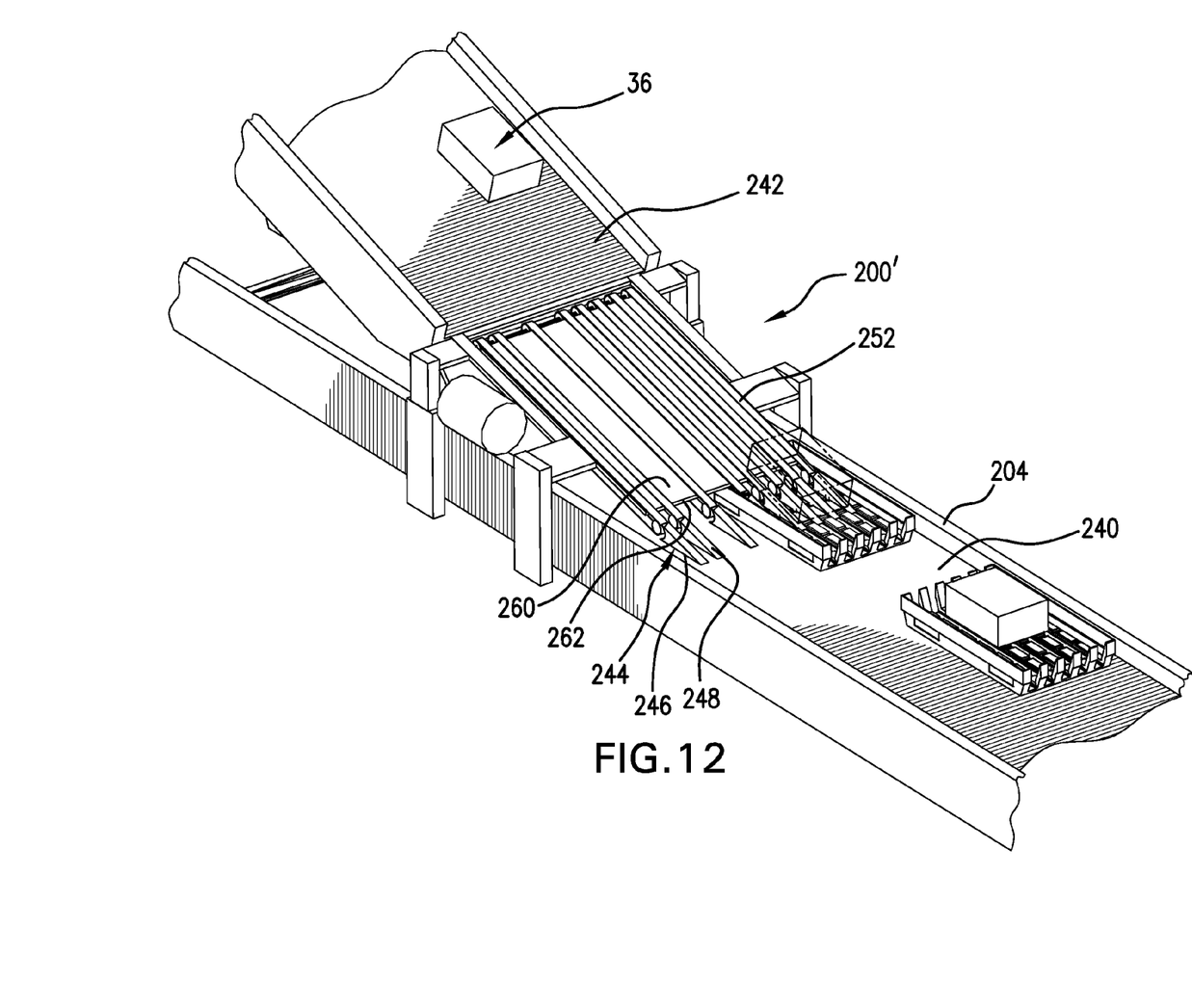
FIG. 12 is a view of a conveyor system including a detraying apparatus.

Trays arrive at the apparatus on the conveyor 240. This conveyor is an item that is presently available from one or more sources and is of the type that, as it conveys the tray, also moves the tray to the right relative to the direction of travel so that the tray is in contact with the side wall 204 of the conveyor when it arrives at the tray unloading machine. This ensures a predictable positioning of the tray as it approaches the unloading machine, thus aligning the slots in the end of the tray with the wedges so that the wedges can enter the slots.

The assembly of conveyor belts 252 is powered by the motor 274 acting through the shaft 220 such that the belts move in the same direction as the conveyor mechanism 240 and they move at a speed that is generally equal to or greater than that of the conveyor 240. Trays containing cartons arrive at the unloading machine on conveyor 240. After a carton is removed from a tray, the unloading machine moves the carton onto the conveyor 242. Empty trays continue on the conveyor 240. The exemplary conveyor 240 is generally horizontal and conveyor 242 is on an incline leading up and away from the unloading machine. Alternative embodiments could vary such that the conveyor 240 slopes downward into the unloading machine with the conveyor 242 being generally level, or could also be such that both conveyors are on an incline or both are horizontal.

In use, the tray unloading machine operates in an unattended fashion and enables the following process. Trays containing cartons approach the apparatus on a conveyor. Each tray may be one of multiple predetermined sizes and the carton carried by the tray can vary in size and weight. Additionally, either end of the tray can approach the apparatus first. Without interrupting the continuous motion of the carton, the apparatus removes the carton from the tray, allowing the now empty tray to continue in motion and it moves the carton onto a separate conveyor for continued processing.

One or more embodiments of the present invention have been described. Nevertheless, it will be understood that various modifications may be made without departing from the spirit and scope of the invention. For example, when applied to different existing warehouse environments (e.g., conveyor systems, etc) details of such environments will influence details of any particular implementation. Accordingly, other embodiments are within the scope of the following claims.

We claim:

1. A system comprising:
    a plurality of trays (20; 20'; 20"), each comprising:
        a base (22);
        a pair of side walls (28) extending upward from the base; and
        a pair of end walls (30) extending upward from the base;
    a tray delivery conveyor (240);
    a tray content removal conveyor (242); and
    a transfer system (200; 200'),
    wherein:
        the transfer system comprises a plurality of fingers (202A-202I);
        each of the end walls comprise a plurality of vertical slots (40) open to an upper edge of the end wall;
        the fingers are positioned and dimensioned to pass through the slots of the trays as the trays are delivered by the tray delivery conveyor to lift contents of the trays; and
        the fingers are laterally asymmetrically positioned.

2. The system of claim 1 wherein:
    the plurality of trays includes trays of a plurality of different widths; and
    a plurality of the fingers are positioned at a non-constant spacing effective to accommodate the different widths.

3. The system of claim 1 wherein:
    the plurality of the fingers are positioned at a non-constant spacing comprising:
        a first group at a constant first on-center pitch; and
        a plurality of additional fingers separated from the first group by one or more gaps.

4. The system of claim 3 wherein:
    the plurality of additional fingers comprises:
        a single intermediate finger separated from the first group by a first gap at an on-center dimension other than a multiple of said first on-center pitch; and
        at least two more fingers separated from the intermediate finger by a second gap at an on-center dimension other than a multiple of said first on-center pitch.

5. The system of claim 4 wherein:
    the first group consists of five fingers; and
    the at least two additional fingers consists of said two additional fingers at said first on-center pitch.

6. The system of claim 1 wherein:
    the fingers, each comprise:
        a tip member (244); and
        a conveyor (252); and
    the fingers' conveyors are positioned to guide the contents to the tray content removal conveyor.

7. The system of claim 6 wherein:
    the fingers' conveyors are powered.

8. The system of claim 6 wherein:
    a motor powers the fingers' conveyors in common.

9. A method for operating the system of claim 1, the method comprising:
    driving the tray delivery conveyor to move the trays downstream to the transfer system;
    passing at least some of the fingers through the slots of the trays as the trays are delivered by the tray delivery conveyor, the passing including:
        passing the tip members through a leading one of the end walls of each tray; and
        passing the tip members into grooves in the base of each tray and below the contents, a wedging action of the tip members providing an initial said lift of the contents of the trays;
    passing the contents along the fingers to the finger conveyors;
    driving the finger conveyors to transfer the contents to the tray content removal conveyor; and
    driving the tray content removal conveyor to further transport the contents.

10. The method of claim 9 wherein:
    a trailing one of the end walls pushes the contents up the tip portions; and
    the fingers pass, inside-to-outside through the trailing end wall.

11. The method of claim 9 wherein:
    there are a plurality of different widths of said trays; and
    partially different groups of the fingers pass through the slots respectively of the trays of different widths.

12. A system comprising:
    a plurality of trays (20; 20'; 20"), each comprising:
        a base (22);
        a pair of side walls (28) extending upward from the base; and
        a pair of end walls (30) extending upward from the base;
    a tray delivery conveyor (240);
    a tray content removal conveyor (242);
    a transfer system (200; 200'),
    wherein:
        each of the end walls comprise a plurality of vertical slots (40) open to an upper edge of the end wall; and
        the transfer system comprises means for passing through the slots of the trays as the trays are delivered by the tray delivery conveyor to lift contents of the trays while accommodating:
            reversed orientations of the trays; and
            different widths of the trays.

13. A system comprising:
    a plurality of trays (20; 20'; 20"), each comprising:
        a base (22); and
        a pair of end walls (30) extending upward from the base;
    a tray unloading system (200; 200'),
    wherein:
        the plurality of trays includes trays of a plurality of different widths;
        the tray unloading system comprises a plurality of fingers (202A-202I);

each of the end walls comprise a plurality of vertical slots (40) open to an upper edge of the end wall;

the fingers are positioned and dimensioned to pass through the slots of the trays as the trays are delivered to lift contents of the trays; and the fingers are positioned so that some fingers pass through the slots of each of the different widths, but others pass only through slots of wider said widths.

14. The system of claim 13 wherein:

a plurality of the fingers are positioned at a non-constant spacing effective to accommodate the different widths.

15. The system of claim 13 wherein:

the different widths include at least first, second, and third widths; and the fingers are positioned at a spacing effective to accommodate the different widths as firsts of the first side walls of the trays pass in a predetermined alignment with a first edge of the conveyor so that:

- the first width is accommodated by a first terminal group of the fingers passing through associated ones of the slots with the second side wall passing through a first gap between the first terminal group and a remainder of the fingers;
- the second width is accommodated by the first terminal group of the fingers and at least one of the remainder passing through associated ones of the slots with the second side wall passing through a second gap between the at least one of the remainder and remaining fingers of the remainder; and
- the third width is accommodated by the first terminal group of the fingers and at least two of the remainder passing through associated ones of the slots.

* * * * *